(No Model.)
J. C. DITTRICH & F. M. GRUMBACHER.
PROCESS OF TREATING LIQUIDS WITH OZONE.
No. 487,089. Patented Nov. 29, 1892.
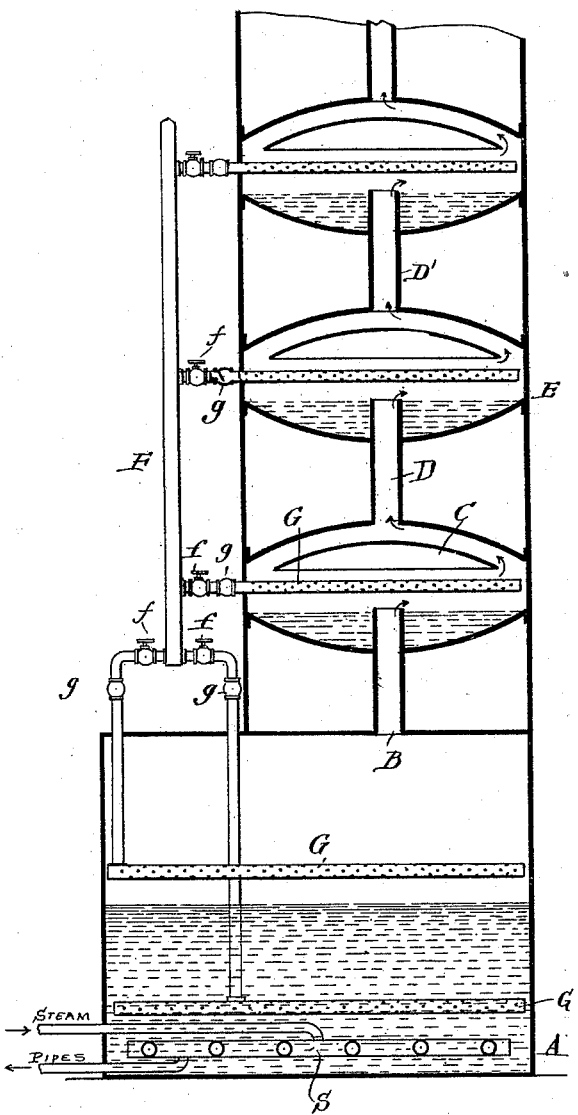

UNITED STATES PATENT OFFICE.

JULIUS CARL DITTRICH AND FREDERICK M. GRUMBACHER, OF NEW YORK, N. Y., ASSIGNORS TO THE OZONE MANUFACTURING COMPANY, OF NEW JERSEY.

PROCESS OF TREATING LIQUIDS WITH OZONE.

SPECIFICATION forming part of Letters Patent No. 487,089, dated November 29, 1892.

Application filed November 12, 1891. Serial No. 411,738. (No model.)

*To all whom it may concern:*

Be it known that we, JULIUS CARL DITTRICH, a subject of the Emperor of Germany, and FREDERICK MAURICE GRUMBACHER, (who has declared his intention to become a citizen of the United States,) both residing in the city, county, and State of New York, have invented a certain new and useful Process of Treating Liquids with Ozone; and we do hereby declare the following to be a full, clear, and exact description of the same, reference being had to the accompanying drawing, forming part of this specification.

The present invention relates to the treatment of liquids to purify them, and the main object is to provide a process by which the purification can be more quickly and perfectly accomplished than by processes now in common use.

In general terms the invention consists in vaporizing the liquid to be purified by means of heat and introducing ozone into the vapors in sufficient quantities to oxidize impurities which pass over with the vapors, but not in sufficient quantities to change the nature of the liquid—as, for example, by converting alcohol when it is the liquid being treated into acetic acid.

The invention also consists in first treating the liquid to be purified with chemical purifiers, such as quicklime, caustic soda, or bisulphide of sodium, alone or in combination, and then vaporizing said liquid and introducing ozone in the manner above described.

In carrying out our process we preferably use the apparatus illustrated in the accompanying drawing, which shows a still with three condensers in section. The liquid to be treated is placed in the chamber A of the still and is heated by steam-pipes S to the necessary temperature for vaporizing the liquid under treatment, or it may be heated by other suitable means. The vapors rising in the chamber A pass upward through the pipe B into the chamber C, where they are partially condensed, thence through pipe D into chamber E, where they are still further condensed, and so on through as many condensing-chambers as may be comprised in the "column" of the still, or until they are all condensed into liquid form. A pipe F, arranged outside of the still, has branch pipes G G G leading from it into the several chambers A C E. These branch pipes are perforated throughout the portions projecting within the chamber and are provided with stop-cocks $f$ and check-valves $g$ for the purpose of regulating the passage of the ozone and preventing the escape of vapors should they at any time exert a pressure greater than that of the ozone. The upper end of the pipe F extends to and is connected with an ozone machine or reservoir, from which ozone passes through the pipe F to the still through the perforated branch pipes G when the stop-cocks $f$ are opened. By means of said stop-cocks the amount of ozone entering the several chambers can be accurately regulated.

As above indicated, the liquid to be purified may be first treated with a chemical purifier, and this may be put in the liquid either before or after the latter is put in the still. In the latter case the act of heating the liquid may also aid the chemical action, causing the chemical purifier to more rapidly and perfectly absorb, oxidize, neutralize, or precipitate a portion of the impurities in the liquid, and thereby causing the vapor which passes to the condensers to be purer than it would be were the liquid vaporized in its original impure state. Moreover we find by many experiments that the vapors produced from liquids treated as above indicated contain a trace of the chemical substances placed in the liquid and that the effect is to cause it to be more readily acted upon by the ozone introduced into the vapors. This is especially true when the liquid undergoes a partial initial purification by means of an alkaline substance.

To illustrate the use of the process, we may describe the treatment of wood-alcohol, which is as follows: The wood-alcohol, which contains small quantities of acetaldehyde and acetone and certain other objectionable elements, is placed in the still A, preferably with an alkaline substance, such as quicklime. The lime acts on some of the impurities and neutralizes the acids in the liquid under treatment, the main effect of the lime being to convert the acetaldehyde and acetone into resinous substances. Instead of using quicklime, or in connection with quicklime, we may use bisulphide of sodium. The main effect of the bisulphide will be to reduce the acetone. As the vapors rise into the condensation-chambers, ozone is admitted thereto and quickly reduces the impurities, which pass over with the vapors. Heretofore it has been very difficult or practically impossible to remove the acetaldehyde and acetone, although their presence in wood-alcohol unfit it for use in many industrial processes. By distilling the alcohol and introducing a regulated amount of ozone, and especially by distilling the alcohol with an alkali and bisulphide of sodium, or either, these and other impurities are removed easily and cheaply.

We are aware that oils, liquids, and liquors have been treated with ozone by having the latter forced through them or by being sprayed into a chamber having an atmosphere of ozone. We do not, therefore, claim broadly the submitting of liquids to the action of ozone, our invention being limited to the purification of liquids by vaporizing them with or without a partial chemical purification and then ozonizing the vapors as hereinbefore set forth. The main advantage of applying the ozone to the vapors is that it is brought into more intimate contact with the whole mass of the liquid than is possible when the substance is treated in its liquid form. As already indicated, the quantity of ozone introduced is not sufficient to change the character of the liquid, but the liquid as it comes from the apparatus is the same as that first introduced, except that it is freed from its impurities. There may be a trace of ozone in the liquid, owing to the use of a slight excess of the gas; but this will be slight and will soon disappear. We are also aware that it has been proposed to oxidize alcohol to acetic acid by introducing air, oxygen, or ozone into vapor of the alcohol in the presence of platinum, and these things we disclaim.

What we claim is—

1. The process of treating liquids, which consists in vaporizing them and introducing into the vapors a small quantity of ozone, said quantity being sufficient to oxidize impurities in the vapors, but insufficient to change the nature of the substance being treated, substantially as described.

2. The process of purifying liquids, which consists in vaporizing said liquids, passing the same through condensation-chambers, and introducing into said chambers ozone in sufficient quantities to oxidize impurities, but insufficient to change the nature of the substance being treated, substantially as described.

3. The process of purifying liquids, which consists in adding a chemical purifier thereto, vaporizing the liquids thus treated, and ozonizing the vapors to remove impurities existing in the vapors, substantially as described.

4. The process of purifying wood-alcohol, which consists in vaporizing it and introducing into the vapors a quantity of ozone sufficient to oxidize impurities in the vapors, but insufficient to change the nature of the alcohol being treated, substantially as described.

5. The process of purifying wood-alcohol, which consists in placing the same in a suitable vessel, adding quicklime thereto, vaporizing the alcohol, and admitting ozone to the vapors in sufficient quantities only to oxidize impurities therein, but not to reduce the alcohol, substantially as described.

In testimony that we claim the foregoing as our invention we have signed our names, in presence of two witnesses, this 27th day of October, 1891.

JULIUS CARL DITTRICH. [L. S.]
F. M. GRUMBACHER. [L. S.]

Witnesses:
HENRY D. HOBSON,
L. H. LATIMER.